US009922076B2

(12) United States Patent
Cerasaro et al.

(10) Patent No.: US 9,922,076 B2
(45) Date of Patent: *Mar. 20, 2018

(54) DATABASE SCHEMA UPGRADE AS A SERVICE (71) Applicant: International Business Machines Corporation, Armonk, NY (US)

(72) Inventors: Eliana Cerasaro, Rome (IT); Arcangelo Di Balsamo, Aprilia (IT); Franco Mossotto, Rome (IT); Sandro Piccinini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 604 days.

This patent is subject to a terminal disclaimer.

(21) Appl. No.: 14/608,345

(22) Filed: Jan. 29, 2015

(65) Prior Publication Data
US 2015/0363436 A1 Dec. 17, 2015

Related U.S. Application Data (63) Continuation of application No. 14/306,271, filed on Jun. 17, 2014, now Pat. No. 9,607,037.

(51) Int. Cl.
*G06F 17/30* (2006.01)

(52) U.S. Cl.
CPC .. *G06F 17/30377* (2013.01); *G06F 17/30297* (2013.01); *G06F 2201/805* (2013.01)

(58) Field of Classification Search
None
See application file for complete search history.

(56) References Cited

U.S. PATENT DOCUMENTS 7,792,800 B1 9/2010 Carson, Jr. et al.
8,250,119 B2 8/2012 Z•zrivec et al.
(Continued)

FOREIGN PATENT DOCUMENTS

WO 2008113162 A1 9/2008

OTHER PUBLICATIONS

Liu et al., "Data Storage Schema Upgrade via Metadata Evolution in SaaS," IEEE, 2012, p. 3148-3151, Shandong University, Jinan, China.
Lukasik, "Database Versioning and Delivery with Upgrade Scripts," InfoQ, Aug. 23, 2013, p. 1-9, http://www.infoq.com/articles/db-versioning-scripts, Accessed on Jun. 11, 2014.
Marks, "A Metadata Driven Approach to Performing Multi-Vendor Database Schema Upgrades," 19th IEEE International Conference and Workshops on Engineering of Computer-Based Systems, 2012, p. 108-116, IEEE Computer Society.
Weissbrod, "Database Schema Versioning Management 101," CodeProject, Apr. 10, 2007, p. 1-6, CPOL, http://www.codeproject.com/Articles/18341/Database-Schema-Versioning-Management, Accessed on Jun. 11, 2014.

(Continued)

*Primary Examiner* — Anh Tai Tran
(74) *Attorney, Agent, or Firm* — Patricia B. Feighan (57) ABSTRACT A method for upgrading a database schema in real time, wherein the database schema is associated with a plurality of databases is provided. The method may include installing a first plugin on a database upgrade process associated with a database. The method may include installing a second plugin on each database instance within the plurality of databases. The method may include determining a delta associated with a final target version of the database schema. Additionally, the method may include outlining an existence of an incongruence, an existence of an override or an existence of a customization removal based on the determined delta. The method may include performing a peer-to-peer broadcasting analysis between each database. The method may include defining a migration strategy for each database instance within the plurality of databases based on the peer-to-peer broadcasting analysis. The method may further include creating a script for upgrading the database schema.

7 Claims, 4 Drawing Sheets

(56) References Cited

U.S. PATENT DOCUMENTS

| | | | |
|---|---|---|---|
| 8,417,737 B2 | 4/2013 | Hopmann et al. | |
| 8,571,882 B1* | 10/2013 | Teitelbaum | G06F 17/30575 |
| | | | 705/2 |
| 9,607,037 B2 | 3/2017 | Cerasaro et al. | |
| 2011/0213759 A1* | 9/2011 | Zazrivec | G06F 17/30297 |
| | | | 707/695 |
| 2012/0023080 A1 | 1/2012 | Bolohan et al. | |
| 2013/0318129 A1* | 11/2013 | Vingralek | G06F 17/30595 |
| | | | 707/803 |
| 2014/0059232 A1* | 2/2014 | Plattner | H04L 67/1029 |
| | | | 709/226 |
| 2015/0019195 A1* | 1/2015 | Davis | G06F 11/3447 |
| | | | 703/17 |
| 2017/0154072 A1 | 6/2017 | Cerasaro et al. | |

OTHER PUBLICATIONS

Pending U.S. Appl. No. 14/306,271, filed Jun. 17, 2014, entitled: "Database Schema Upgrade as a Service".

IBM: List of IBM Patents or Patent Applications Treated as Related (Appendix P), dated Feb. 2, 2015.

Pending U.S. Appl. No. 14/306,271, filed Jun. 17, 2014, entitled-"Database Schema Upgrade as a Service".

IBM, "List of IBM Patents or Patent Applications Treated as Related (Appendix P)," Oct. 10, 2017, p. 1-2.

\* cited by examiner

DATABASE SCHEMA UPGRADE AS A SERVICE

FIELD OF THE INVENTION

The present invention relates generally to the field of computing, and more particularly to database schemas.

BACKGROUND

A database schema of a database system is the database's structure described in a formal language supported by the database management system (DBMS). The database schema refers to the organization of data as a blueprint of how a database is constructed. A database schema is a set of formulas (sentences) often referred to as integrity constraints imposed on a database. These integrity constraints may ensure compatibility between parts of the schema. All constraints are expressible in the same language. When a developer develops a software using a database, several versions of the database schema may exist either during the development life cycle of the database as well as when the database is in production in a customer environment.

SUMMARY

According to one embodiment, a method for upgrading a database schema in real time, wherein the database schema is associated with a plurality of databases is provided. The method may include installing a first plugin on a database upgrade process associated with a database. The method may also include installing a second plugin on each database instance within the plurality of databases. The method may further include determining, by the first plugin, a delta associated with a final target version of the database schema. Additionally, the method may include outlining, by the second plugin, an existence of an incongruence, an existence of an override or an existence of a customization removal based on the determined delta. The method may also include performing, by the second plugin, a peer-to-peer broadcasting analysis between each database instance within the plurality of databases based on the outlining. The method may include defining, by the first plugin, a migration strategy for each database instance within the plurality of databases based on the peer-to-peer broadcasting analysis. The method may further include creating, by the first plugin, a script for upgrading the database schema on each database instance within the plurality of databases based on the defined migration.

According to another embodiment, a computer system for upgrading a database schema in real time, wherein the database schema is associated with a plurality of databases is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The method may include installing a first plugin on a database upgrade process associated with a database. The method may also include installing a second plugin on each database instance within the plurality of databases. The method may further include determining, by the first plugin, a delta associated with a final target version of the database schema. Additionally, the method may include outlining, by the second plugin, an existence of an incongruence, an existence of an override or an existence of a customization removal based on the determined delta. The method may also include performing, by the second plugin, a peer-to-peer broadcasting analysis between each database instance within the plurality of databases based on the outlining. The method may include defining, by the first plugin, a migration strategy for each database instance within the plurality of databases based on the peer-to-peer broadcasting analysis. The method may further include creating, by the first plugin, a script for upgrading the database schema on each database instance within the plurality of databases based on the defined migration.

According to yet another embodiment, a computer program product for upgrading a database schema in real time, wherein the database schema is associated with a plurality of databases is provided. The computer program product may include one or more computer-readable tangible storage medium and program instructions stored on at least one of the one or more tangible storage medium, the program instructions executable by a processor. The computer program product may include program instructions to install a first plugin on a database upgrade process associated with a database. The computer program product may also include program instructions to install a second plugin on each database instance within the plurality of databases. The computer program product may further include program instructions to determine, by the first plugin, a delta associated with a final target version of the database schema. Additionally, the computer program product may include program instructions to outline, by the second plugin, an existence of an incongruence, an existence of an override or an existence of a customization removal based on the determined delta. The computer program product may also include program instructions to perform, by the second plugin, a peer-to-peer broadcasting analysis between each database instance within the plurality of databases based on the outlining. The program instructions may include program instructions to define, by the first plugin, a migration strategy for each database instance within the plurality of databases based on the peer-to-peer broadcasting analysis. The computer program product may further include program instructions to create, by the first plugin, a script for upgrading the database schema on each database instance within the plurality of databases based on the defined migration.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate to the field of computing, and more particularly to database schemas. The following described exemplary embodiments provide a system, method and program product to, among other things, provide a service for upgrading a database schema.

As previously described, when a developer develops a software using a database, several versions of the database schema may exist either during the development life cycle of the database as well as when the database is in production in a customer environment. Furthermore, when the database must be migrated to a new version due to a new build or a new production release, it may become difficult to manage all of the system peculiarities while being able to successfully upgrade the database. A common solution to such a problem may be to develop a set of scripts that has the capability to transform the starting schema into a new schema. However, such a mechanism often fails since the customization for each instance of the database may take a long time. Additionally, in the context of software being utilized as a service, the customization issues may become even larger since the volume of the database may be quite large for a single product. Therefore, it may be advantageous, among other things, to provide a dynamic, resilient, and flexible upgrade system strategy.

According to at least one embodiment, the database schema may be upgraded based on a real time schema validation and introspection to create a final script without failure rather than based on a static creation of upgrade scripts that depend on the specific starting points that may fail. Furthermore, according to one implementation, the present embodiment may be iterative so that according to a defined policy (e.g., add, modify, delete) or according to a role of the operator so that the goals may be achieved in a segmented way via multiple independent steps. Additionally, consistency rules may be added so that based on specified parameters, multiple databases may converge to a common schema or maintain the schema's peculiarities.

According to at least one implementation of the present embodiment, a plugin may be installed on a database that may be responsible for interaction between multiple databases in the same site, customer region or any defined group. The plugin may act differently according to the version control system that is client-server based since the main behavior of the present embodiment is client-client. Additionally, the plugin may provide the capability to define either some default, such as 'when an index is removed from a table, keep it in the upgrade if other database instances have the same index'; however the plugin may also have the capability to define variable based rules (e.g., same group, same network, etc.) or trusted groups to use for the decision. Furthermore, the plugin may also be able (differently from the traditional 'version control system' that may statically decide or not decide code merging of code) to be adaptive toward the changes and build itself an upgrade strategy by site or by database role. The adaptation may also be dynamically adjusted based on performance statistics or real time data since the upgrade strategy may be live, operating in real time and able to respond to changes in the external conditions when a specific choice is triggered.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide a service for upgrading a database schema. According to at least one implementation, the present embodiment is based on a database plugin that may provide either the interfaces to be contacted by an installer program or the interfaces to cooperate with other database instances. Moreover, the specific plugin may also host a set of behavior profiles 'instrumenting' the upgrade process about the default choices. An example of an instruction in the profile may be, 'when an index is removed from a table, keep it in the upgrade if other database instances have the same index'. When the plugin runs, it may be able to retrieve all the information about the target version of the database schema and storing the information in XML files, separating, for more selective use, the information about tables, constraints, indexes, sequences, views and grants for every database's schema. According to this approach, the schema migration may be consolidated in multiple steps that may be executed according to an iterative approach. Furthermore, when changes have to be applied, in order to upgrade an old database schema version, the plugin may compare the schema objects with the target ones outlining the differences and automatically creating the SQL statements that are needed to bring the database to the expected new version.

For example, if the NOT NULL constraint on the column C1 of the table S.T1 is added in the new version of the database, automatically the second application may generate the following SQL statements:

```
ALTER TABLE S.T1
ALTER COLUMN C1 SET NOT NULL
;
REORG TABLE S.T1 ALLOW READ ACCESS
;
```

As a second step (2), other instances of the databases (same network, same distributed installation, or whatever custom defined rule) may be queried to create a complete upgrade plan and build a consolidated decision strategy on the single instance.

The third step (3) in case of the source not having consistency with the expected schema: the present embodiment may gain access to database statistic to automatically build a decision on the upgrade. For example, when a table or an index is found in the source database and it is not present on the target database, the plugin may either access the database statistic and/or query other databases on the network to understand if it is used and must be maintained in the new one.

The last step (4) may be comparing the needed authorization for each SQL statement and grouping steps according to the required roles. For example, a group of instructions to be executed by a standard user and another group of instructions to be executed for an administrator.

The decisions of steps 2, 3 and 4 (above) may be defined by the profile, prompted to the user or any combination of the two approaches.

Figure 1:
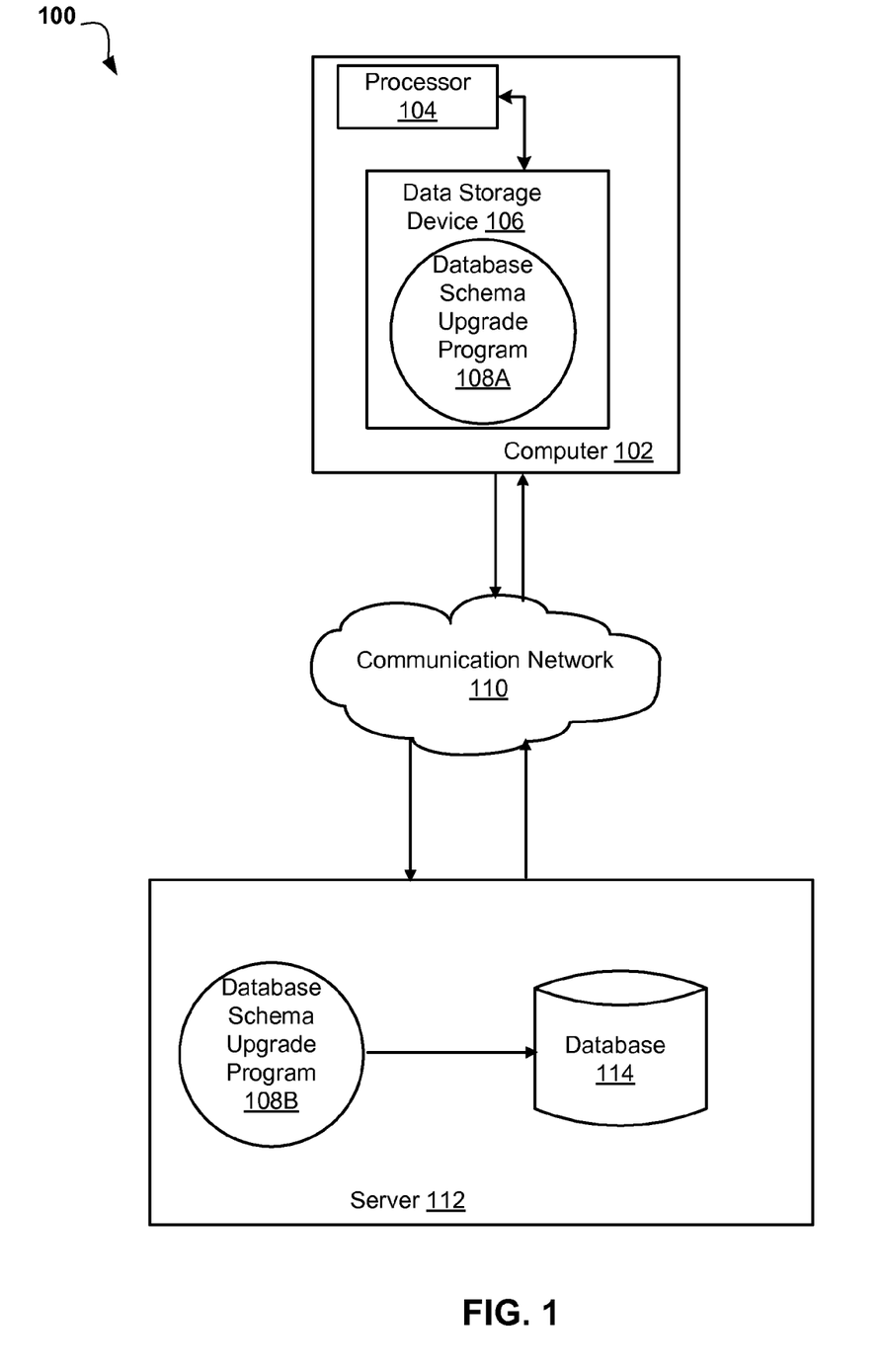
FIG. 1 illustrates a networked computer environment according to at least one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a Database Schema Upgrade Program 108A. The networked computer environment 100 may also include a server 112 that is enabled to run a Database Schema Upgrade Program 108B and a communication network 110. The server 112 may also include a database 114. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as a Database Schema Upgrade Program 108A and 108B may run on the client computer 102 or on the server computer 112. The Database Schema Upgrade Program 108A, 108B may provide a service for upgrading a database schema. According to at least one implementation of the present embodiment, the Database Schema Upgrade Program 108A, 108B may be implemented as a plugin and may be installed on a database that may be responsible for interaction between multiple databases in the same site, customer region or any defined group. The Database Schema Upgrade method is explained in further detail below with respect to FIG. 3.

Figure 2:
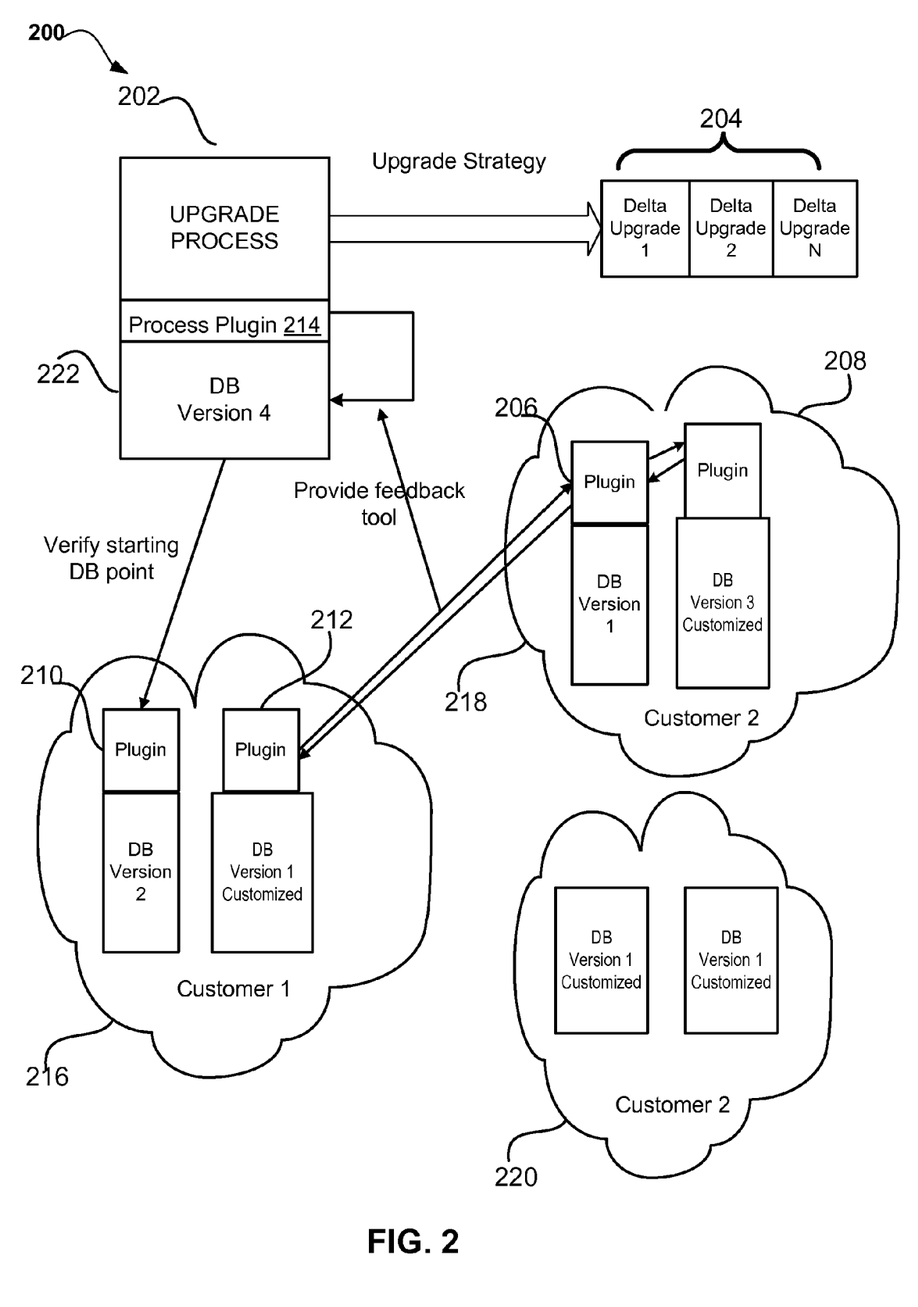
FIG. 2 illustrates a networked computer environment with a schema upgrade strategy according to at least one embodiment.

Referring now to FIG. 2, a networked computer environment 200 with a schema upgrade strategy 204 in accordance with one embodiment is depicted. According to at least one implementation, the present embodiment may include an upgrade process 202. The upgrade process 202 may be the traditional installer package with associated a relational database management system (RDMS). For example, with respect to FIG. 2, the RDMS is indicated as version 4 of a database 222. According to one implementation, the upgrade process may also include a process plugin component 214 (i.e., a first plugin) of the Database Schema Upgrade Program 108A, 108B (FIG. 1) that may be able to interact with other plugin components 206-212 (i.e., a second plugin) of the Database Schema Upgrade Program 108A, 108B (FIG. 1).

The Database Schema Upgrade Program 108A, 108B (FIG. 1) is depicted as having the process plugin component 214 with respect to FIG. 2 which may provide either the interfaces to be contacted by an installer program or the interfaces to cooperate with other database instances such as "Customer 1" 216, "Customer 2" 218 and "Customer N" 220. Moreover, the specific process plugin 214 may also host a set of behavior profiles 'instrumenting' the upgrade process about the default choices. An example of such an instruction into the profile may be 'when an index is removed from a table, keep it in the upgrade if other database instances have the same index'.

According to one implementation, the Database Schema Upgrade Program 108A, 108B (FIG. 1) may include a first and a second plugin for upgrading a database schema in real time, where the database schema is associated with a plurality of databases. The first plugin may be implemented as part of the upgrade process 202 associated with a database 222. The second plugin may be installed as a plugin 206-212 on each database instance. The first plugin 214 may determine a delta associated with a final target version of the database schema. Then, the second plugin 206-212 may outline an existence of an incongruence, an existence of an override or an existence of a customization removal based on the determined delta. Next, the second plugin 206-212 may perform a peer-to-peer broadcasting analysis between each database instance within the plurality of databases based on the outlining. The first plugin 214 may then define a migration strategy for each database instance within the plurality of databases based on the peer-to-peer broadcasting analysis. Then, the first plugin 214 may create a script for upgrading the database schema on each database instance within the plurality of databases based on the defined migration.

Figure 3:
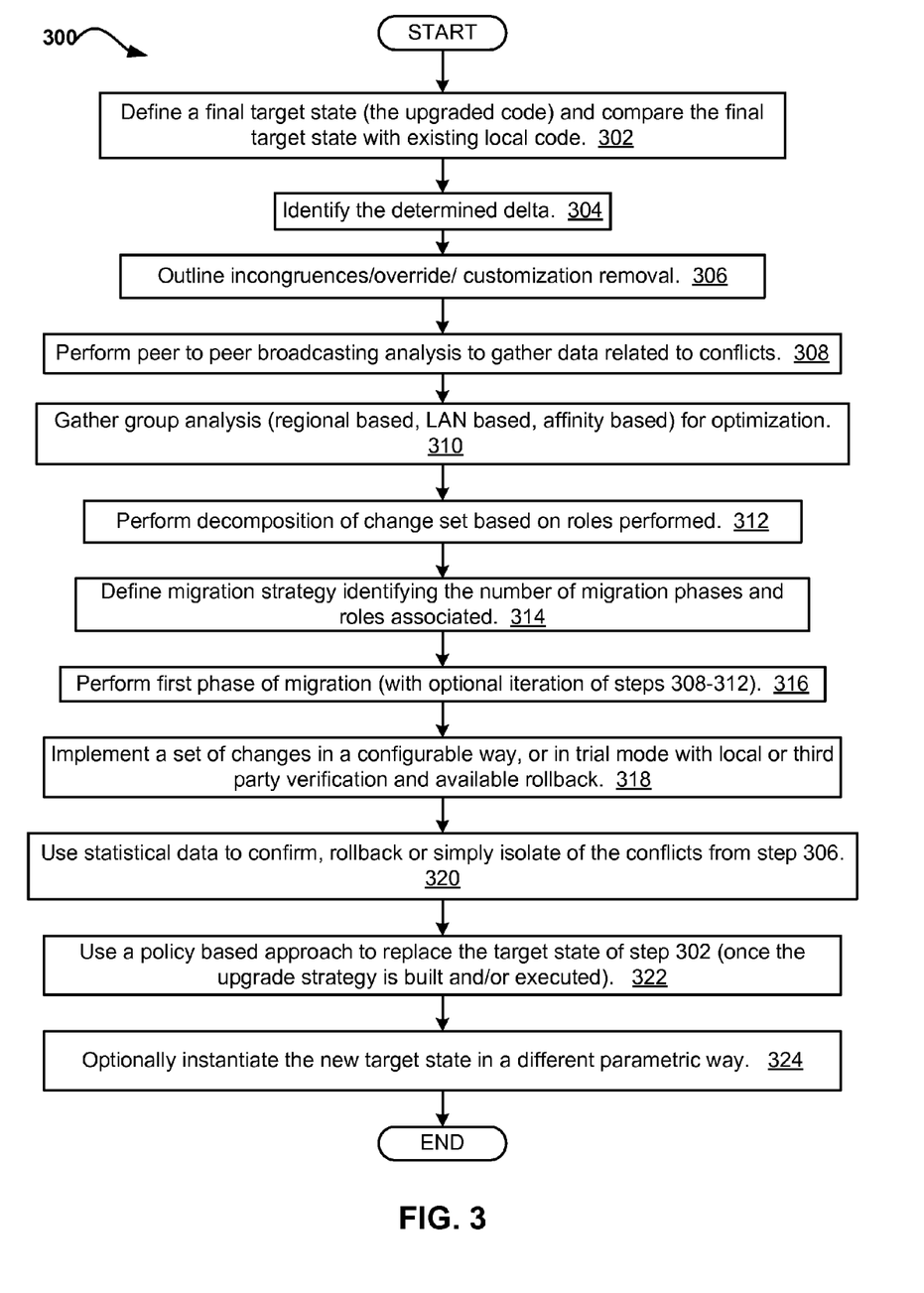
FIG. 3 is an operational flowchart illustrating the steps carried out by a program to upgrade a database schema according to at least one embodiment.

FIG. 3, an operational flowchart 300 illustrating the steps carried out by a program upgrade a database schema in accordance with one embodiment is depicted. According to the present embodiment, the Database Schema Upgrade Program 108A, 108B (FIG. 1) may be implemented as a first plugin 214 (FIG. 2) that may be installed as part of the upgrade process 202 (FIG. 2) on a database 222 (FIG. 2) that may be responsible for interaction between multiple databases with their respective plugins 206-212 (i.e., a second plugin) in the same site, customer region or any defined group. The Database Schema Upgrade Program 108A, 108B (FIG. 1) (i.e., the process plugin 214 (FIG. 2) and the corresponding plugins 206-212 (FIG. 2) on each database instance) may provide the capability to define either some default or variable based rules (e.g., same group, same network, etc.) or trusted groups to use for the decision. Furthermore, the plugin 214 along with the corresponding plugins on each database instance 206-212 (FIG. 2) may also be able to be adaptive toward the changes and build itself an upgrade strategy by site or by database role. The adaptation may also be dynamically adjusted based on performance statistic or real time data.

Referring now to FIG. 3 at 302, a final target state (e.g., the upgraded code) is defined by the upgrade process plugin component 214 (FIG. 2) and the final target state is compared with the existing code. As such, the final state of database is compared with the existing database schema to determine whether the expected database version (n−1) needs to be customized or changed during that time.

Next at 304, the determined delta is identified by the upgrade process plugin component 214 (FIG. 2). Therefore, the determined delta between the target version of the database and the current version of the database is identified. Then at 306, the incongruences, override, and customization removal are outlined by the database plugins 206-212 (FIG. 2) associated with each instance of the database. For example, any incongruence (i.e., difference) between the expected schema and a possible override of the local customization may be outlined.

Next at 308, peer-to-peer broadcasting analysis is performed by the database plugins 206-212 (FIG. 2) associated with each instance of the database to gather data related conflicts. As such, each plugin 206-212 (FIG. 2) associated with each instance of the database may broadcast a request to other peers (i.e., other database plugins 206-212) (FIG. 2) in order to gather information about conflicts. For example, "my database version has an index of the table removed, what about your version"?

Then at 310, group analysis (regional based, LAN based, affinity based) may be gathered by the database plugins 206-212 (FIG. 2) associated with each instance of the database for optimization. As such, the previous analysis may be profiled according to the specific configuration. For example, a request may be restricted or a greater weight may be given to database instances of the same network, same vendor, same customer type, such as banking customers, etc.

Next at 312, decomposition of change set based on roles may be performed by the database plugins 206-212 (FIG. 2) associated with each instance of the database. Therefore, the changes to be applied are decomposed by roles once they are identified. For example, a change may be identified as requiring the role of Administrative right, while another change may be identified as having a standard user right.

Then at 314, the migration strategy may be defined identifying the number of migration phases and roles associated. As such, the upgrade strategy may be defined by the database plugins 206-212 (FIG. 2) associated with each instance of the database with the number of steps and the roles associated with the steps (e.g., 3 steps by Admin and 2 by standard user).

Next, at 316, the first phase of migration may be performed by the database plugins 206-212 (FIG. 2) associated with each instance of the database with optional iteration of previous steps 308-312. Therefore, the previous steps of 308-312 may be performed in an iterative way.

Then at 318, a set of changes may be implemented by the database plugins 206-212 (FIG. 2) associated with each instance of the database in a configurable way or in trial mode with local or third party verification and available rollback. As such, some of the steps may be configured to comply with specific local rules. For example, Administrator changes may happen in specific timeframes or some set of changes, such as table dropping may happen in a sort of trial mode that may delete the tables, monitor for a specific timeframe (optionally check or compare performance with peers) and then decide to commit or rollback changes.

Next at 320, statistical data may be used by the database plugins 206-212 (FIG. 2) associated with each instance of the database to confirm, rollback or simply isolate one of conflicts of step 306. For example, some steps may be validated by statistical data, such as an index in a table guaranteed a performance improvement in which case the plugin may decide not to remove the conflict.

Then at 322, once the upgrade strategy is built and/or executed by the upgrade process plugin component 214 (FIG. 2), a policy based approach may promote the strategy to replace the target state of step 302. For example, the upgrade strategy may replace the original target state and or associate the target with a specific policy (e.g., performance optimization, banking customers, etc.).

Next at 324, the new target state may optionally be differently instantiated by the upgrade process plugin component 214 (FIG. 2) in a parametric way. For example, the final state for a database local to region1 with network xxx is target1. As such, the new target may be instantiated in a parametric way so that when the new target is applied to a specific database instance, one or more policies may be used and the relative target may be applied.

It may be appreciated that FIG. 3 provides only an illustration of one implementation and does not imply any limitations with regard to how different embodiments may be implemented. Many modifications to the depicted environments may be made based on design and implementation requirements. For example, according to one implementation, the database plugin component associated with each instance of the database 206-212 (FIG. 2) may be responsible for steps 306-320 previously described above with respect to FIG. 3 and the upgrade process component (i.e., process plugin) 214 (FIG. 2) may be responsible for steps 302-304 and steps 322-324 previously described above with respect to FIG. 3.

The present embodiment may have the capability to successfully upgrade a database schema despite the peculiarities of the database and therefore, may be significant in distributed environments, such as a database schema that may be related to a software as a service solution where there is no prefixed starting schema. Also, the present embodiment have advantages in terms of code maintenance since there may not be the need to maintain different versions of code associated with different versions of schemas. Furthermore, another advantage may be the built in capability to allow multiple role like standard operators or administrative operators to concur to the upgrade at different times according to an iterative approach. Additionally, the present embodiment may be able to consolidate schemas based on information matching and computation between multiple instances of the database.

Figure 4:
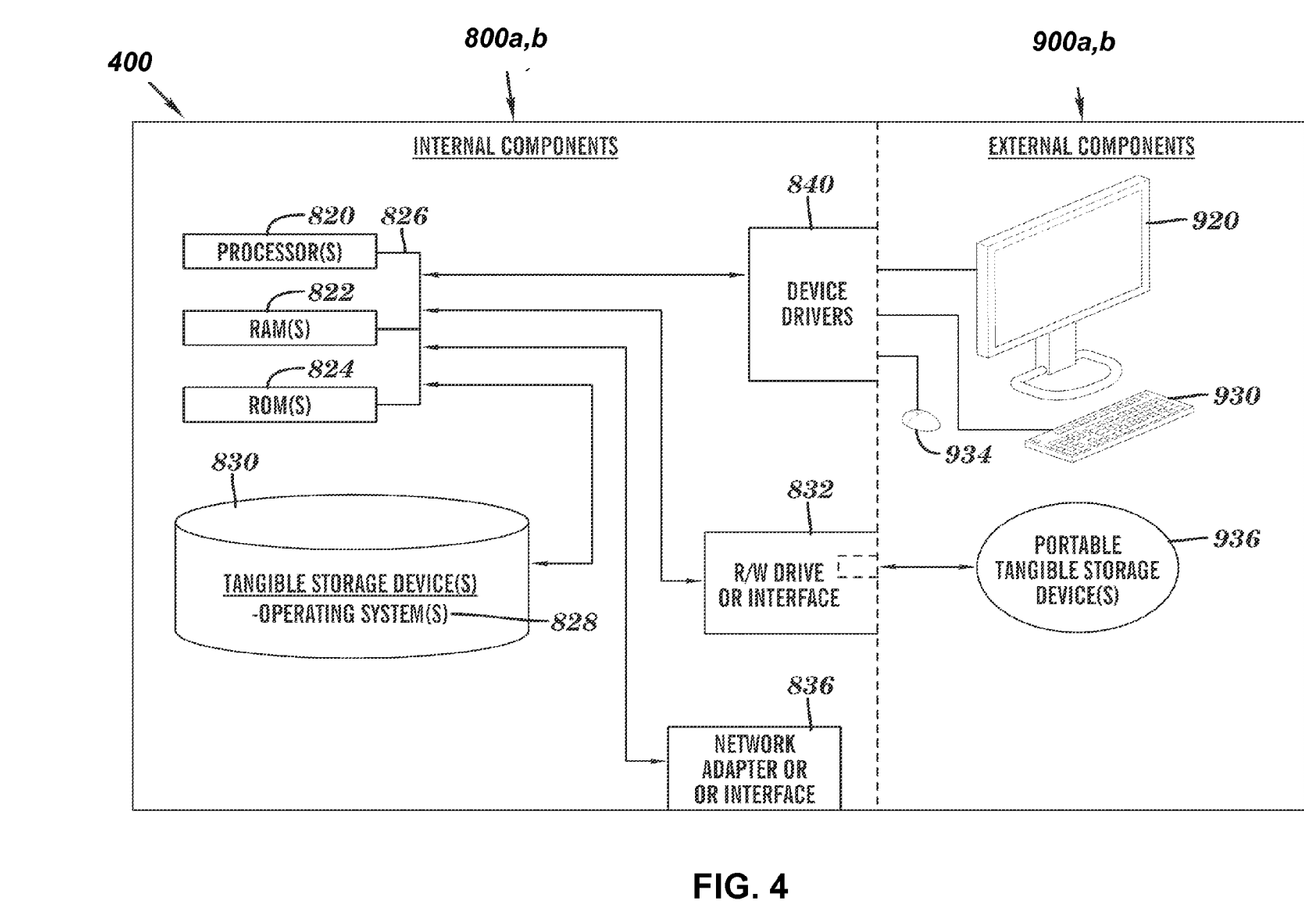
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and Database Schema Upgrade Program 108A (FIG. 1) in client computer 102 (FIG. 1) and Database Schema Upgrade Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as Database Schema Upgrade Program 108A (FIG. 1) and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The Database Schema Upgrade Program 108A (FIG. 1) in client computer 102 (FIG. 1) and Database Schema Upgrade Program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the Database Schema Upgrade Program 108A (FIG. 1) in client computer 102 (FIG. 1) and the Database Schema Upgrade Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for upgrading a database schema in real time, wherein the database schema is associated with a plurality of databases, the method comprising:
    installing a first plugin on a database upgrade process associated with a database;
    installing a second plugin on each database instance within the plurality of databases;
    determining, by the first plugin, a delta associated with a final target version of the database schema;
    outlining, by the second plugin, an existence of an incongruence, an existence of an override or an existence of a customization removal based on the determined delta;
    performing, by the second plugin, a peer-to-peer broadcasting analysis between each database instance within the plurality of databases based on the outlining;
    defining, by the first plugin, a migration strategy for each database instance within the plurality of databases based on the peer-to-peer broadcasting analysis; and
    creating, by the first plugin, a script for upgrading the database schema on each database instance within the plurality of databases based on the defined migration.

2. The method of claim 1, wherein the final target version comprises an upgraded version of the database schema.

3. The method of claim 1, wherein the determined delta comprises a comparison of the final target version of the database schema with a current version of the database schema associated each database instance within the plurality of databases.

4. The method of claim 1, wherein the peer-to-peer broadcasting analysis comprises at least one of a gathering of data related to conflicts, a gathering of group analysis data, and a gathering of roles associated with the database instance.

5. The method of claim 4, wherein a decomposition of a change set is performed based on the gathering of roles associated with each database instance.

6. The method of claim 1, wherein the defining the migration strategy for each database instance comprises identifying a plurality of migration phases required and identifying at least one corresponding role associated with each migration phase within the plurality of migration phases.

7. The method of claim 1, wherein the created script for upgrading the database schema on each database instance within the plurality of databases is executed automatically on each database instance within the plurality of databases.

* * * * *